(12) United States Patent
Guethe et al.

(10) Patent No.: US 9,664,110 B2
(45) Date of Patent: May 30, 2017

(54) GAS TURBINE POWER PLANT WITH NON-HOMOGENEOUS INPUT GAS

(71) Applicant: ALSTOM Technology Ltd, Baden (CH)

(72) Inventors: Felix Guethe, Basel (CH); Madhavan Narasimhan Poyyapakkam, Potkreuz (CH); Frank Graf, Nussbaumen (CH); Bruno Schuermans, La Tour de Peilz (CH); Eribert Benz, Birmenstorf (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 260 days.

(21) Appl. No.: 14/492,222

(22) Filed: Sep. 22, 2014

(65) Prior Publication Data

US 2015/0007576 A1     Jan. 8, 2015

Related U.S. Application Data

(63) Continuation of application No. PCT/EP2013/055991, filed on Mar. 21, 2013.

(30) Foreign Application Priority Data

Mar. 24, 2012    (EP) .................................... 12161146

(51) Int. Cl.
*F02C 3/34*        (2006.01)
*F02C 7/08*        (2006.01)
(Continued)

(52) U.S. Cl.
CPC ................ *F02C 3/34* (2013.01); *F02C 3/13* (2013.01); *F02C 7/08* (2013.01); *F23C 9/00* (2013.01);
(Continued)

(58) Field of Classification Search
CPC ....... F02C 3/34; F02C 3/13; F23C 9/00; F23C 2202/30; F23R 3/04; F23R 3/26; F23R 3/286
(Continued)

(56) References Cited

U.S. PATENT DOCUMENTS 3,703,807 A  *  11/1972  Rice ....................... F01K 23/103
                                                  60/39.182
7,503,178 B2     3/2009  Bucker et al.
(Continued)

FOREIGN PATENT DOCUMENTS

CN         1898499 A       1/2007
DE       1 262 074 B       2/1968
(Continued)

OTHER PUBLICATIONS

Office Action (First) issued on Oct. 9, 2015, by the State Intellectual Property Office of the People's Republic of China in corresponding Chinese Patent Application No. 2013800162669 and an English translation of the Office Action. (16 pgs).
(Continued)

*Primary Examiner* — Steven Sutherland
(74) *Attorney, Agent, or Firm* — Buchanan Ingersoll & Rooney PC (57) ABSTRACT

The invention relates to a method for operating a gas turbine which includes a compressor with annular inlet area, at least two burners, a combustion chamber and a turbine. According to the method, at least one first partial intake flow, consisting of oxygen-reduced gas which has an oxygen concentration which is lower than the average oxygen concentration of the compressor intake flow, and at least one second partial intake flow, consisting of fresh air, are fed to the compressor in an alternating manner in the circumferential direction of the inlet area. In addition, the invention
(Continued)

relates to a gas turbine power plant with a gas turbine, the compressor inlet of which includes at least one first segment and at least one second segment which are arranged in an alternating manner around a compressor inlet in the circumferential direction, wherein a feed for an oxygen-reduced gas is connected to the first segment and a fresh air feed is connected to the second segment of the compressor inlet.

15 Claims, 7 Drawing Sheets

(51) Int. Cl.
*F23R 3/28* (2006.01)
*F23R 3/26* (2006.01)
*F23C 9/00* (2006.01)
*F02C 3/13* (2006.01)
*F23R 3/04* (2006.01)

(52) U.S. Cl.
CPC .................. *F23R 3/04* (2013.01); *F23R 3/26* (2013.01); *F23R 3/286* (2013.01); *F23C 2202/30* (2013.01)

(58) Field of Classification Search
USPC ........................................ 60/39.52
See application file for complete search history.

(56) References Cited

U.S. PATENT DOCUMENTS

| | | | |
|---|---|---|---|
| 7,721,552 B2 | 5/2010 | Hansson et al. | |
| 2006/0248896 A1 | 11/2006 | Hansson | |
| 2006/0272331 A1 | 12/2006 | Bucker et al. | |
| 2011/0289898 A1* | 12/2011 | Hellat | F01K 23/10 60/39.52 |
| 2011/0289899 A1* | 12/2011 | De La Cruz Garcia | F01K 17/04 60/39.182 |

FOREIGN PATENT DOCUMENTS

| | | |
|---|---|---|
| EP | 0 718 470 A2 | 6/1996 |
| EP | 2 348 256 A1 | 7/2011 |
| NL | 7 203 948 A | 9/1973 |
| WO | 2004106718 A | 12/2004 |
| WO | 2005/064232 A1 | 7/2005 |
| WO | 2005/095864 A1 | 10/2005 |
| WO | 2010/142573 A2 | 12/2010 |

OTHER PUBLICATIONS

The International Search Report and the Written Opinion of the International Searching Authority, International Appln. No. PCT/EP2013/055991, dated Jun. 18, 2013.

* cited by examiner

GAS TURBINE POWER PLANT WITH NON-HOMOGENEOUS INPUT GAS

CROSS-REFERENCE TO RELATED APPLICATIONS

This application claims priority to PCT/EP2013/055991 filed Mar. 21, 2013, which claims priority to European application 12161146.1 filed Mar. 24, 2012, both of which are hereby incorporated in their entireties.

TECHNICAL FIELD

The present disclosure relates to a method for operating a gas turbine with two intake flows of different gas compositions and also to a gas turbine with a split compressor inlet.

BACKGROUND

A gas which is as homogeneous as possible is conventionally fed to the compressor of gas turbines for compression. In applications in which gases with different composition are provided, these are first mixed and then fed to the compressor. For example, in the case of recirculation of flue gases, use is made of a flue gas with a gas composition which differs from that of fresh air. Recirculation is a technology which can basically be used in gas turbines for a wide variety of purposes, for example for controlling emissions, for reducing the flue gas volume, for carbon dioxide separation, etc. During the recirculation of flue gases in a gas turbine, a significant proportion of the flue gas is branched from the overall flue gas flow and, after cooling and scrubbing, is normally fed again to the intake mass flow of the turbine or to the compressor of the turbine. The flue gas composition differs appreciably from the composition of fresh ambient air. The recirculated flue gas flow is conventionally mixed with fresh air from the environment and this mixture is then fed to the compressor.

By means of flue gas recirculation, the carbon dioxide partial pressure in the flue gases can advantageously be increased in order to reduce power losses and efficiency losses of power plants with carbon dioxide separation. In addition, flue gas recirculation has been proposed with the aim of reducing the oxygen content in the intake gases of gas turbines in order to thereby reduce NOx emissions.

In the prior art, in order to ensure satisfactory combustion in the case of low oxygen content of the combustible gases, the fresh air is mixed with the recirculated flue gases as thoroughly as possible in order to provide a homogeneous gas mixture at the combustion chamber inlet. A mixer which is suitable for low pressure loss mixing of fresh air with recirculated flue gases is known from WO2010/142573 A2, for example.

Depending upon operating conditions, stability problems, especially pulsations (also referred to as thermoacoustic vibrations) can occur during combustion in a gas turbine with premix burners. In order to reduce pulsations, it is known from WO2005095864 to supply individual burners with fuel in a throttled manner, as a result of which the premix burners in question have a combustion temperature which differs from the combustion temperature of all the other unthrottled premix burners. This leads to an asymmetry in the temperature distribution of the premix burner arrangement, as a result of which the development of pulsations inside the combustion chamber can be effectively counteracted.

The throttled burners operate at a hot gas temperature which is reduced compared with the average hot gas temperature, but which can lead to incomplete combustion. In addition, the unthrottled burners operate at an increased hot gas temperature, which can lead to higher NOx emissions and can have a negative effect upon the service life.

Incomplete combustion can lead to increased CO emissions (carbon monoxide emissions), especially in plants with flue gas recirculation, in which the intake gases of the gas turbine have a reduced oxygen content compared with fresh air.

SUMMARY

It is an aim of the present disclosure to specify a method for the reliable, clean and low-pulsation operation of a gas turbine, and also a gas turbine for implementing the method. Proposed in the disclosed method is a gas turbine plant with at least two partial intake flows of different gas compositions, in which the different oxygen concentrations of the partial intake flows are used for stabilizing the combustion.

The disclosed method is distinguished by oxygen-reduced gas and fresh air being fed separately in a gas turbine so that at least one first partial intake flow, consisting of oxygen-reduced gas, and at least one second partial intake flow, consisting of fresh air, are fed to the compressor in an alternating manner in the circumferential direction of the inlet area.

The gas turbine comprises a compressor with an inlet cross section, a combustion chamber connected downstream to the compressor, in which the compressed gases are combusted with fuel, and a turbine, in which the hot combustion gases are expanded.

A gas which has an oxygen concentration which is lower than the average oxygen concentration of the compressor intake flow is referred to in this case as oxygen-reduced gas. The oxygen concentration of the oxygen-reduced gas is typically at least 1% lower than the average oxygen concentration of the compressor inlet flow. The oxygen concentration of the oxygen-reduced gas is preferably at least 2% lower than the average oxygen concentration of the compressor intake flow.

As a result of the circumferentially alternating feed of fresh air and oxygen-reduced gas, the reactivity of the fuel in adjacent burners of a combustion chamber is altered. The reactivity of fuel in fresh air is higher than that of fuel in oxygen-reduced gas so that the flame position in a combustion chamber (or in a combustion chamber section), into which oxygen-reduced gas flows, is displaced downstream compared with a combustion chamber which is supplied with fresh air. The different reaction speeds and especially the displaced flame positions alter the thermoacoustic characteristics of the flame and can stabilize these, which leads especially to a reduction or suppression of pulsations.

According to one embodiment of the method, the alternating feed of oxygen-reduced gas and fresh air is carried out via an inner sector of the inlet cross section relative to a rotational axis of the compressor and, in addition, fresh air is fed via an outer sector of the inlet cross section relative to the rotational axis of the compressor.

The fresh air which is fed into the outer sector is at least partially conducted around the combustion chamber as cooling air. A feed of oxygen-reduced gas into the outer sector would therefore have no influence, or little influence, upon the combustion. By limiting the feed of oxygen-reduced gas to the inner sector, the effect upon the combustion can be optimized with a small quantity of oxygen-reduced gas.

Accordingly, less oxygen-reduced gas has to be provided for a desired effect. The plant size and costs for its provision and feed are correspondingly reduced.

According to an alternative embodiment of the method, the alternating feed of oxygen-reduced gas and fresh air is carried out via an inner sector of the inlet cross section relative to a rotational axis of the compressor and in addition oxygen-reduced gas is fed via an outer sector of the inlet cross section relative to a rotational axis of the compressor. This method is particularly advantageous when the oxygen concentration in the flue gases is to be minimized. The oxygen-reduced gas, which is fed via the outer sector, is at least partially conducted around the combustion chamber as cooling air and is admixed with the hot combustible gases as cooling air, which, in comparison to a conventional admixing of fresh air as cooling gas, leads to a reduced oxygen content, or to no increase of the oxygen content, in the flue gases.

According to one embodiment of the method, a first partial intake flow, consisting of oxygen-reduced gas, is directed in each case into one burner, or into an integral multiple of adjacent burners, downstream of the compressor.

According to a further embodiment of the method, a second partial intake flow, consisting of fresh air, is directed in each case into one burner, or into an integral multiple of adjacent burners, downstream of the compressor.

As a result of the directed alternating introduction of oxygen-reduced gas and fresh air into adjacent burners, a greatest possible difference of oxygen content in the gases is realized. When the partial intake flows are being introduced, consideration is to be given to the fact that the flows in the compressor are typically rotated, that is to say discharge from the compressor in a manner in which they are rotated by an angle around the rotational axis of the compressor.

According to a further embodiment of the method, the second partial intake flow of fresh air is directed in each case into two respectively adjacent burners downstream of the compressor and/or the first partial intake flow of oxygen-reduced gas is directed in each case into two respectively adjacent burners downstream of the compressor.

The mixing of the hot gases from two adjacent burners in the combustion chamber is typically good enough for the discharge gases from the combustion chamber to be practically homogeneous.

According to yet another embodiment of the method, the fuel feed to a burner which is supplied with oxygen-reduced gas compared with the fuel feed to a burner which is supplied with fresh air is reduced in each case so that the hot combustion gases at the outlet of the combustion chamber have the same oxygen concentration. This method is particularly advantageous when the mixing of hot gases of adjacent burners is prevented or when partial intake flows with different oxygen concentrations are directed to more than two adjacent burners.

For throttling the fuel feed to individual burners, a fixed or variable throttling element, which determines the fuel mass flow to the at least one burner, can be arranged in the fuel distribution system upstream of at least one of the burners. This can be an orifice plate or a valve, for example. In this case, for example, the cross-sectional reduction of the throttling element can be selected so that a desired disparity in the fuel distribution system with regard to the fuel mass flows to the individual burners is achieved.

In addition, for the fuel feed to the individual burners (for example, premix burners) or burner groups of a combustion chamber, provision can be made for a ring main, for example, which is connected in each case to the fuel line of each individual burner. In this case, in a first group of burners, the number of which is preferably selected to be less than half the overall number provided in the burner arrangement, provision is made in at least one of the fuel lines for a control unit, for example a throttling valve or an orifice plate, which influences the fuel feed. By means of a controlled throttling of the fuel supply with regard to a selected group of burners, it is possible on the one hand to create an asymmetric heat feed along an annular burner arrangement in a directed manner, e.g. within the limits of an annular combustion chamber arrangement, and therefore to effectively counteract the burner-induced thermoacoustic vibrations. In addition, the controllable fuel throttling allows individual matching of the burner behavior to basically all the parameters which influence the combustion process. In combination with a correspondingly matched feed of oxygen-reduced gas and fresh air, the positive effect upon the combustion can be enhanced, NOx emissions can be kept low, and a homogeneous oxygen concentration at the combustion chamber outlet can be realized when required.

In order to prevent intermixing of fresh air and oxygen-reduced gas as far as possible, according to one embodiment the compressor inlet, to which is connected the flow passage of the compressor, is split into at least one first segment and at least one second segment, the outlets of which are arranged in an alternating manner around the compressor inlet in the circumferential direction. In this case, fresh air is fed in each case via the at least one first segment and oxygen-reduced gas is fed via the at least one second segment in an alternating manner.

According to an alternative embodiment of the method, the oxygen-reduced gas is introduced via feeds which are arranged upstream of the compressor inlet in a manner in which they are circumferentially distributed on a diameter of the inlet duct concentrically to the rotational axis of the compressor and fresh air is introduced via the actual compressor inlet. This allows controlling of the supplied quantity of oxygen-reduced gas without the flow field at the inlet into the compressor being strongly influenced as a result of a rigid geometry which splits the inlet cross section.

Depending upon the operating concept and the gas turbine, the feed of oxygen-reduced gas is shut off or reduced for start-up and at partial load of the gas turbine. This is necessary in order to ensure a stable, CO (carbon monoxide) depleted combustion, for example. Depending upon the separation of the feeds for fresh air and oxygen-reduced gas of the inlet cross section, an unsatisfactory inflow of the compressor can occur as a result of a reduction of the oxygen-reduced gas. In order to avoid this unsatisfactory inflow, according to a further embodiment of the method fresh air is directed via a control element into the first partial intake flow, consisting of oxygen-reduced gas, at partial load and/or during start-up of the gas turbine.

A reliable source of oxygen-reduced gas is the gas turbine itself. According to one embodiment of the method, the flue gases of the gas turbine are split into a first flue gas flow for recirculation into the intake flow of the gas turbine and into a second flue gas flow for discharging to the environment. In this case, the oxygen-reduced gas, which is fed to the compressor, comprises the recirculated first flue gas flow of the gas turbine.

According to a further embodiment of the method, the area ratio of the connecting area of the outer sector to the flow passage of the compressor to the connecting area of the inner sector to the flow passage of the compressor is varied by means of a control element. In this case, it is varied so that the area ratio is adapted to changes of the ratio between supplied fresh air and recirculated first flue gas flow.

In addition to the method, a gas turbine power plant for implementing the method is a subject of the disclosure. Such a gas turbine power plant comprises a gas turbine with a compressor inlet, a compressor with an annular inlet area, at least two burners, a combustion chamber and a turbine. According to the disclosure, the compressor inlet, to which is connected the flow passage of the compressor, comprises at least one first segment and at least one second segment which are arranged in an alternating manner around the compressor inlet in the circumferential direction, wherein a feed for an oxygen-reduced gas is connected to the at least one first segment of the compressor inlet and a fresh air feed is connected to the at least one second segment of the compressor inlet. In this case, the oxygen-reduced gas is a gas which during operation of the gas turbine has an oxygen concentration which is lower than the average oxygen concentration of the compressor intake flow.

In one embodiment of the gas turbine power plant, the compressor inlet, to which is connected the flow passage of the compressor, is additionally split into an inner sector relative to the rotational axis of the compressor and into an outer sector relative to the rotational axis of the compressor. In this case, the alternating first segments and second segments are arranged in the inner sector of the inlet cross section relative to the rotational axis of the compressor.

In addition, a fresh air feed line can be connected to the outer sector of the compressor inlet or alternatively a feed for an oxygen-reduced gas can be connected to the outer sector of the compressor inlet.

In an alternative embodiment of the gas turbine power plant, the compressor inlet, to which is connected the flow passage of the compressor, comprises an inner sector relative to the rotational axis of the compressor and an outer sector relative to the rotational axis of the compressor, wherein the alternating first segments and second segments are arranged in the outer sector of the inlet cross section relative to the rotational axis of the compressor.

In addition, a fresh air feed line can be connected to the inner sector of the compressor inlet or, alternatively, a feed for an oxygen-reduced gas can be connected to the inner sector of the compressor inlet.

In one embodiment of the gas turbine power plant, an integral multiple of burners are arranged per first segment of the compressor inlet and an integral multiple of burners are arranged per second segment. In this case, the burners are preferably arranged so that taking into consideration a rotation of the flow, which this experiences around the compressor axis during operation, the burners lie downstream in each case of a first or of a second segment of the compressor inlet.

According to one exemplary embodiment of the gas turbine power plant, the at least one first segment and the at least one second segment are separated by means of an inlet baffle plate.

According to a further exemplary embodiment, the gas turbine power plant comprises a control element by means of which the area ratio of the connecting area of the first segment to the flow passage of the compressor to the connecting area of the second segment to the flow passage of the compressor can be varied in order to adapt the area ratio to changes of the ratio between supplied fresh air and oxygen-reduced gas.

In a further exemplary embodiment, a multiplicity of feed passages for introducing the oxygen-reduced gas are arranged in a circumferentially distributed manner concentrically to the axis of the gas turbine. These feed passages can especially be constructed as pipes. In one example, these feed passages are arranged in the inner sector of the compressor inlet. The pipes can be arranged individually or as pipe bundles. They can also be encompassed by a profile which preferably has a flow-dynamic shape with low flow resistance. For the arrangement thereof, existing elements in the compressor inlet, such as the bearing supports of the compressor bearing, can be utilized.

The introduction via individual pipes or groups of pipe bundles allows control of the oxygen-reduced gas without the flow field at the inlet into the compressor being strongly influenced by a rigid geometry which splits the inlet cross section.

One more embodiment of the gas turbine power plant comprises a control element by means of which the area ratio of the connecting area of the outer sector to the flow passage of the compressor to the connecting area of the inner sector to the flow passage of the compressor can be varied or adjusted. Alternatively, or in combination, the gas turbine power plant comprises a control element by means of which the area ratio of the sum of the connecting areas of the at least one first segment to the flow passage of the compressor to the sum of the connecting areas of the at least one second segment to the flow passage of the compressor can be varied. As a result of this variation or adjustment, the area ratio can be adapted to changes of the ratio between supplied fresh air and oxygen-reduced gas. Controlling of the area ratio as a function of the ratio between volumetric flow of supplied fresh air and oxygen-reduced gas is especially advantageous.

According to one exemplary embodiment, the gas turbine power plant comprises an exhaust gas splitter for splitting the flue gas flow of the gas turbine into a first flue gas partial flow, which is recirculated into the intake flow of the gas turbine during operation of the gas turbine, and into a second flue gas partial flow, which is discharged to the environment during operation of the gas turbine. In addition, such a gas turbine power plant comprises a recirculation line which leads from the exhaust gas splitter to at least one first segment of the compressor inlet.

All the explained advantages are applicable not only in the respectively specified combinations but also in other combinations or in isolation without departing from the scope of the disclosure. The disclosure is applicable without limitation to gas turbines with one combustion chamber and also for gas turbines with sequential combustion, as are known from EP0718470, for example.

BRIEF DESCRIPTION OF THE DRAWINGS

Preferred embodiments of the disclosure are described in the following text with reference to the drawings which serve purely for explanation and are not to be construed as being limiting. In the drawings.

DETAILED DESCRIPTION

Figure 1:
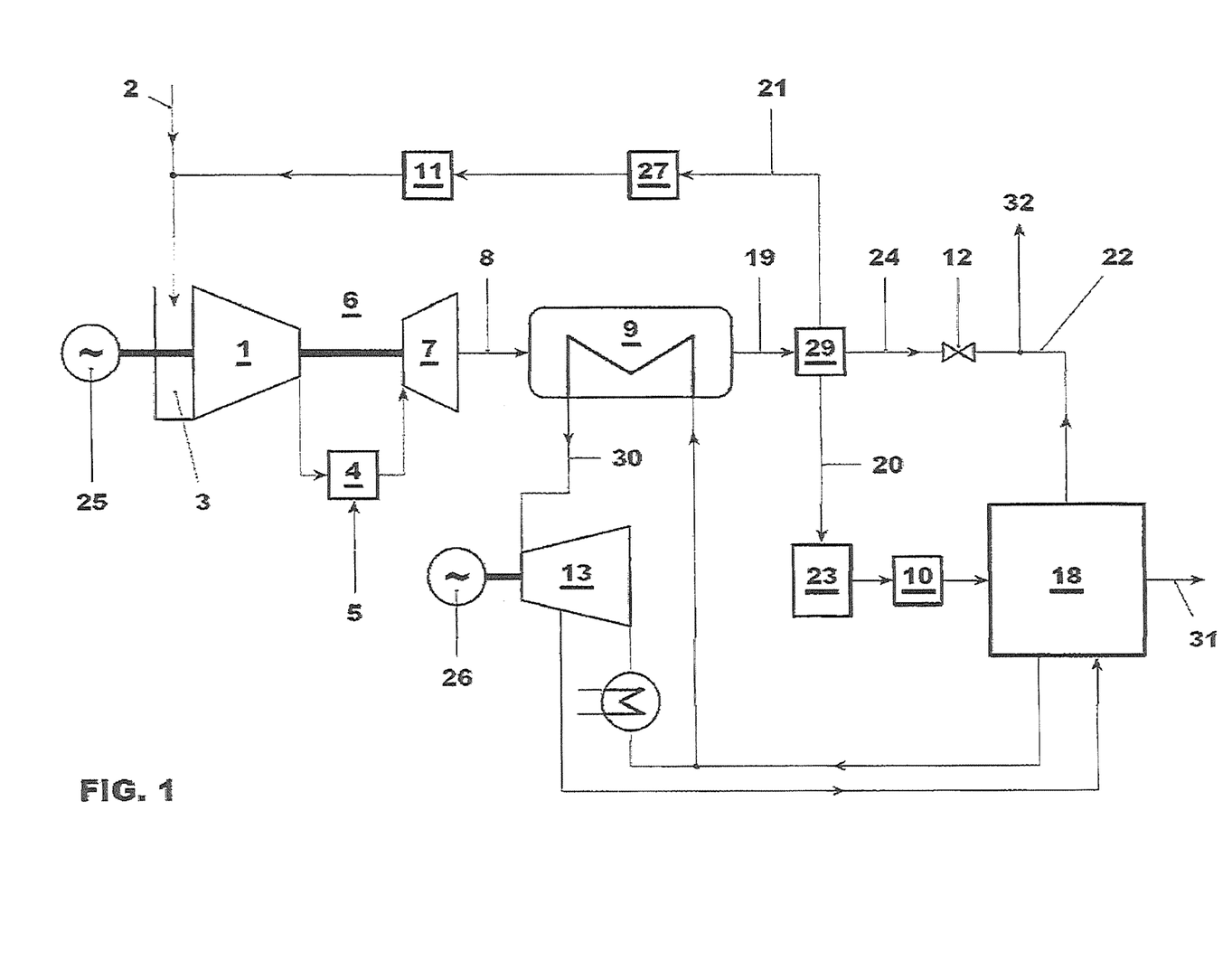
FIG. 1 shows a schematic view of a gas turbine power plant with recirculation of flue gases according to the prior art.

FIG. 1 shows the essential elements of a gas turbine power plant in schematic view. The gas turbine 6 comprises a compressor 1 and the combustion air which is compressed therein is fed to a combustion chamber 4 and combusted there with fuel 5. The hot combustion gases are then expanded in a turbine 7. The useful energy which is produced in the turbine 7 is then converted into electrical energy by a first generator 25, for example, which is arranged on the same shaft 37.

The hot flue gases 8 which discharge from the turbine 7, for optimum utilization of the energy still contained therein, are used in a heat recovery steam generator (HRSG) 9 for producing live steam 30 for a steam turbine 13 or for other plants. The useful energy which is produced in the steam turbine 13 is then converted into electrical energy by a second generator 26, for example, which is arranged on the same shaft 37. The water-steam cycle is simplified in the example and shown only schematically. Various pressure stages, feedwater pumps, etc., are not shown since these are not the subject of the invention.

In such a plant, the flue gases from the heat recovery steam generator 19 are split downstream of the heat recovery steam generator 9 in an exhaust gas splitter 29, which can be controlled, into a first flue gas partial flow 21 and a second flue gas partial flow 20. The first flue gas partial flow 21 is recirculated into the inlet duct of the gas turbine 6 and mixed with fresh air 2 there. The second flue gas partial flow 20, which is not recirculated, is discharged to the environment or, as in this example, additionally cooled via a flue gas recirculation cooler 23 and fed to a $CO_2$ separation system 18. From this, $CO_2$-depleted flue gases 22 are discharged to the environment via an exhaust stack 32. In order to overcome the pressure losses of the $CO_2$ separation system 18 and of the flue gas duct, a flue gas fan 10 can be provided. The $CO_2$ 31 which is separated in the $CO_2$ separation system 18 is typically compressed and discharged for storage or for further treatment. The $CO_2$ separation system 18 is supplied with steam tapped from the steam turbine 13 via a steam extraction facility.

The second flue gas partial flow can also be directly routed to the exhaust stack 32 via a flue gas bypass 24 with a bypass flap 12.

The recirculated first flue gas flow 21 is cooled to a little above ambient temperature in a flue gas recirculation cooler 27 which can be equipped with a condenser. Downstream of this flue gas recirculation cooler 27, a booster or flue gas fan 11 can be arranged for the recirculation flow 21. This recirculated flue gas flow 21 is mixed with fresh air 2 before the mixture is fed as intake flow via the compressor inlet 3 to the gas turbine 6.

Figure 2:
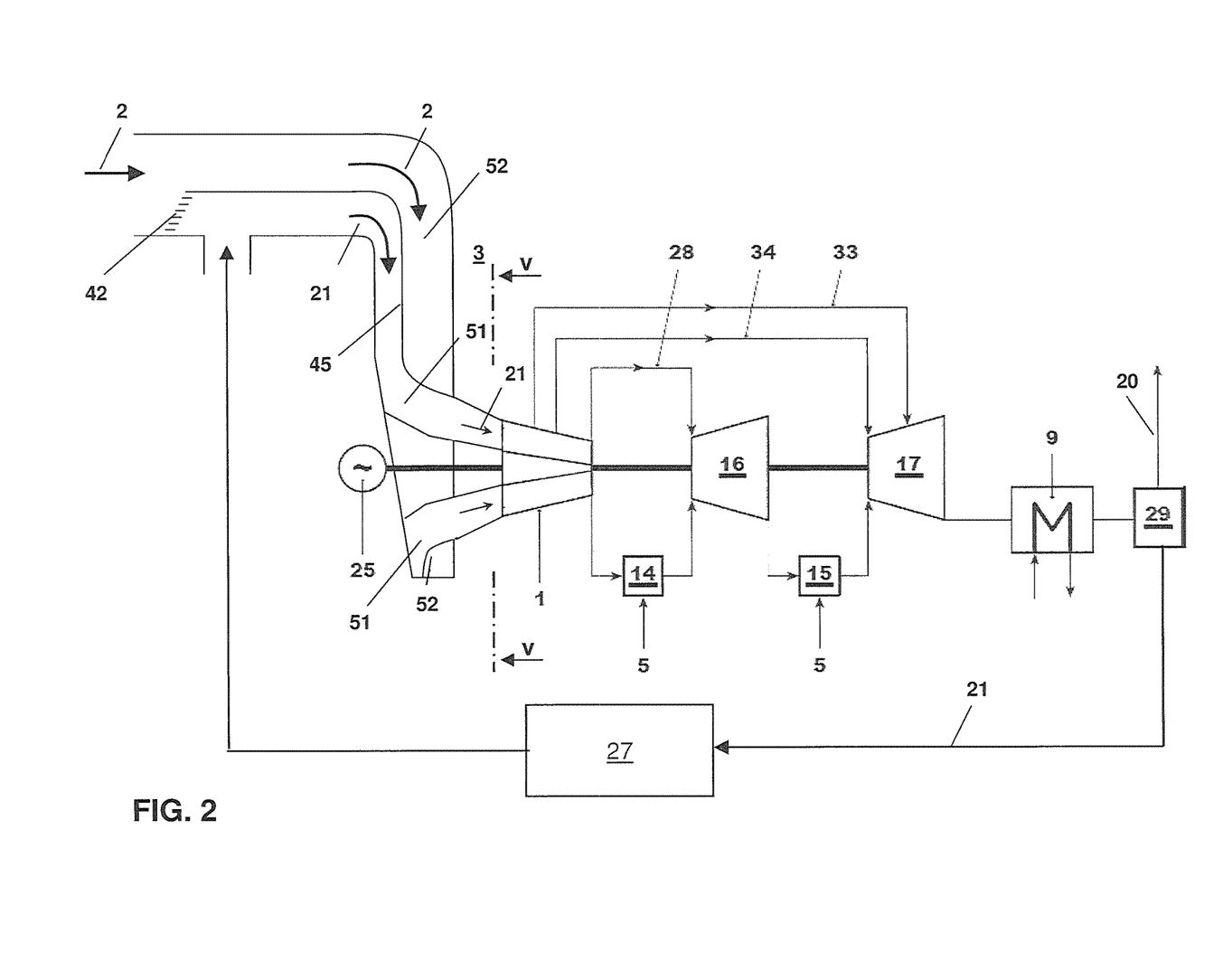
FIG. 2 shows a schematic view of a gas turbine power plant with recirculation of flue gases and with introduction of flue gases and fresh air into the compressor which are fed in an alternating manner in the circumferential direction of the inlet area.

A gas turbine with sequential combustion is shown in FIG. 2. The method is applicable to gas turbines with one combustion chamber and also to gas turbines with sequential combustion. Accordingly, embodiments for gas turbines with one combustion chamber and also for gas turbines with sequential combustion are also possible.

FIG. 2 schematically shows an exemplary embodiment of a gas turbine power plant with a compressor inlet 3 which is split into at least two segments, wherein a feed for the flue gas flow 21 leads into a first segment 51 of the compressor inlet 3, which can be seen in the depicted side view. In addition, a feed for fresh air 2 leads via a second segment 52 of the compressor inlet 3 at the compressor inlet, wherein this second segment 52 lies outside the depicted plane.

Figure 5:
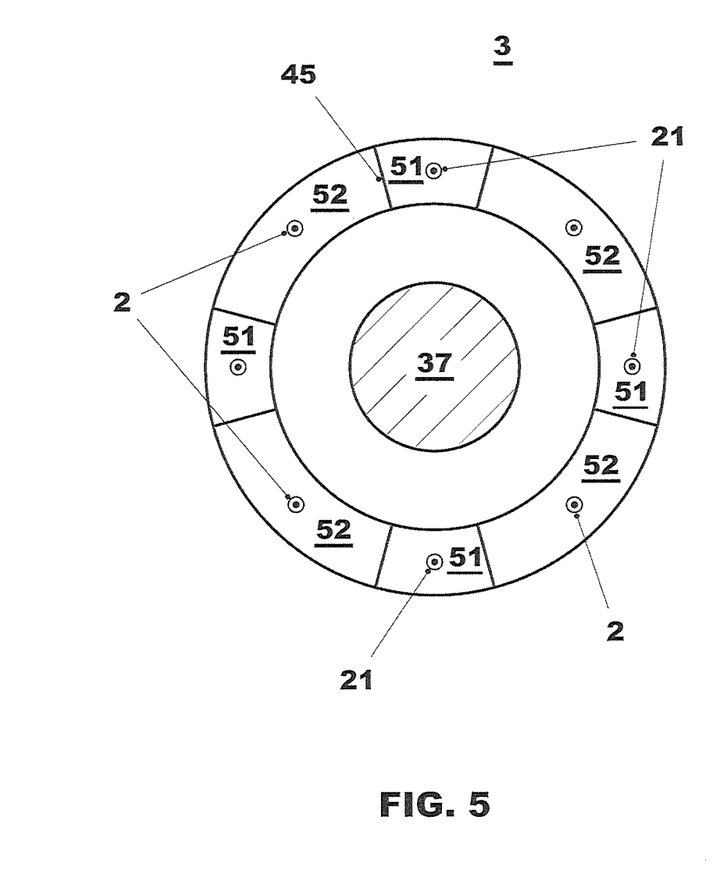
FIG. 5 shows a schematic view of a cross section through a compressor inlet with segments for feed of fresh air and oxygen-reduced gas which are arranged in an alternating manner in the circumferential direction.

The two segments 51, 52 are connected as directly as possible to the flow passage of the compressor 1 on the side of the compressor inlet 3 facing the compressor. The first segment 51 for recirculated flue gases and the second segment 52 for fresh air lead in this case to an annular area of the flow passage in an alternating manner. The corresponding split of the segments in the circumferential direction of the compressor inlet 3 in section v-v is shown in FIG. 5.

Figure 3:
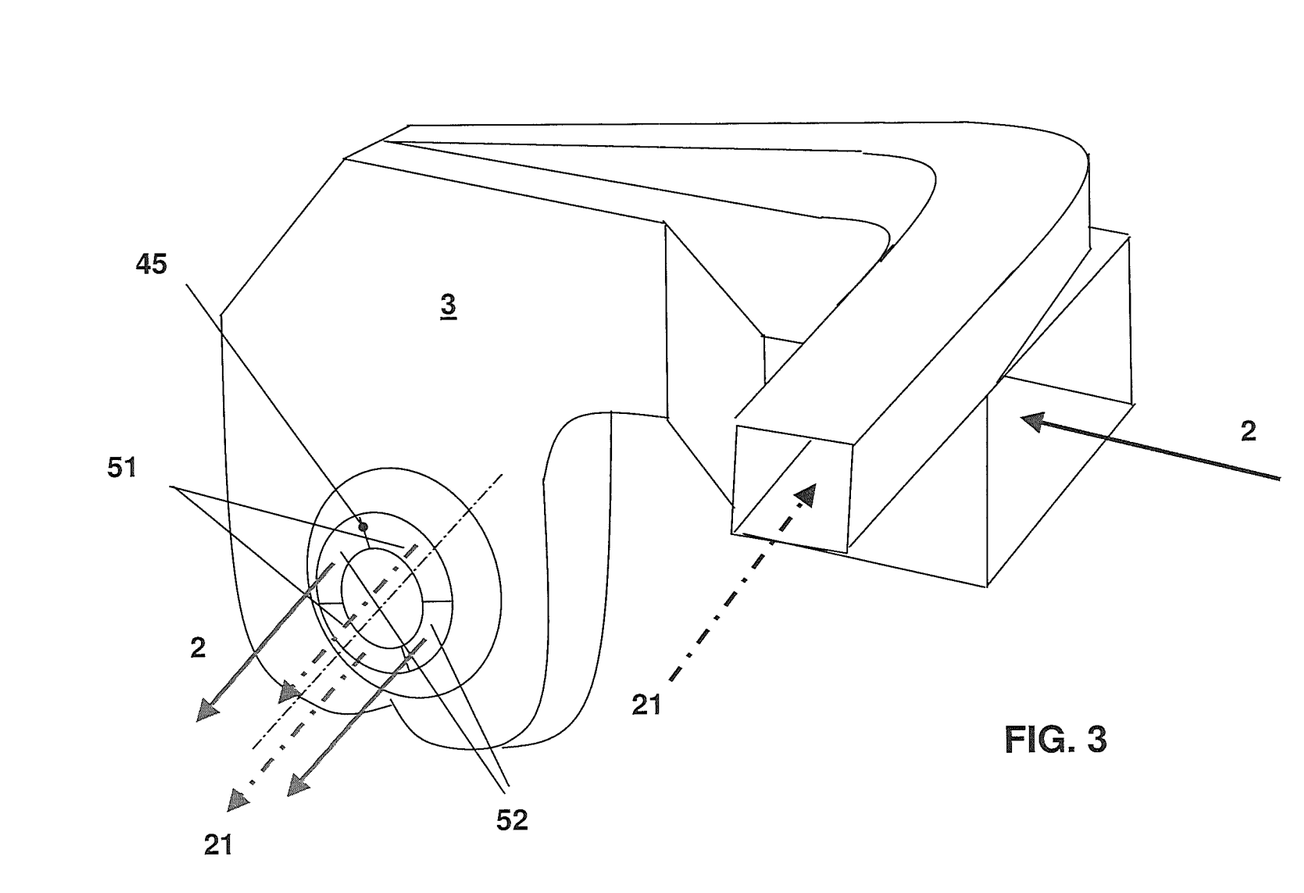
FIG. 3 shows a perspective view of a split compressor inlet for the introduction of recirculated flue gases and fresh air in an alternating manner in the circumferential direction.

FIG. 3 perspectively shows a schematic view of a split compressor inlet with segments 51, 52 for feed of fresh air 2 and oxygen-reduced gas 21 arranged in an alternating manner in the circumferential direction.

In the depicted example, the fresh air 2 is fed from one side to a region of the compressor inlet 3, is horizontally deflected in this and, after a further deflection in the direction of the gas turbine axis, is fed to the compressor. In addition, the oxygen-reduced gas 21, for example a recirculated first flue gas partial flow 21, is directed axially against the main flow direction of the gas turbine to a plane upstream of the compressor inlet 3, is deflected in a further region of the compressor inlet 3 and directed into the gas turbine upstream of the inlet from the side above the gas turbine axis. By means of a second deflection, the oxygen-reduced gas 21 is directed in the direction of the level of the gas turbine axis and, after a further deflection, is fed to the compressor. The two regions of the compressor inlet 3 are separated by means of a partition or an inlet baffle plate 45 which splits the compressor inlet 3, upstream of the compressor inlet, into first segments 51 for the feed of oxygen-reduced gas 21 and into second segments 52 for the feed of fresh air 2. The segments 51, 52 are arranged in an annular manner around the shaft of the gas turbine.

According to one embodiment, the feeds reach right into a region of the compressor inlet 3 in which on account of the velocity of the flow inducted by the compressor the static pressure is reduced so that the oxygen-reduced gas 21 is sucked into the compressor 1 and in the case of a plant with flue gas recirculation, for example, a fan for flue gas recirculation can be dispensed with.

Figure 4:
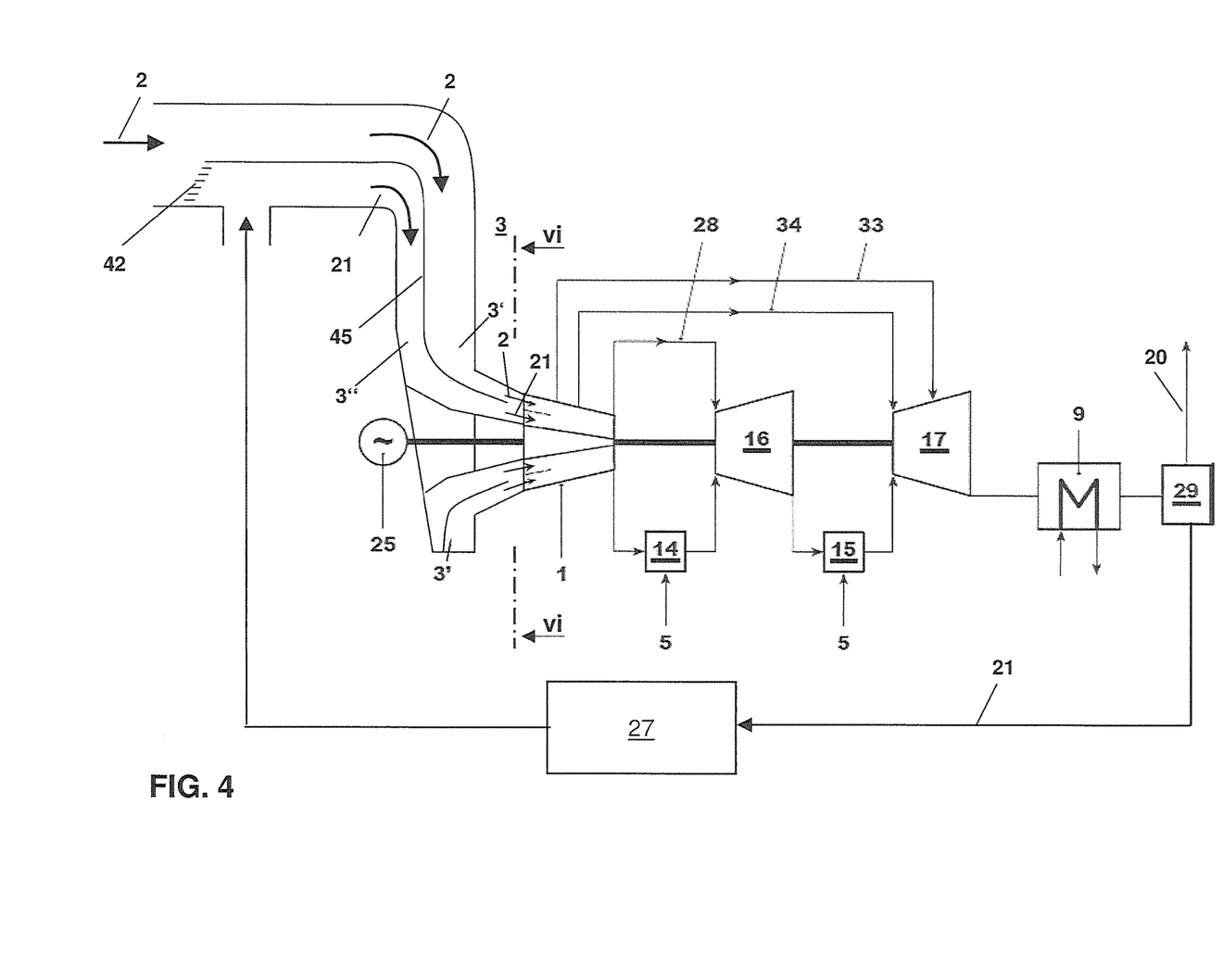
FIG. 4 shows a schematic view of a gas turbine power plant with recirculation of flue gases and with introduction of recirculated flue gases and fresh air into the compressor both in an alternating manner in the circumferential direction of the inlet area and in a stepped manner in the radial direction.

The exemplary embodiment of FIG. 4 is based on that of FIG. 2. In addition to the circumferentially alternating division into segments 52, 51 for the feed of fresh air 2 and for the feed of recirculated flue gases 21, in this example the inlet is split into inlet sectors 3', 3". These sectors 3', 3" are directly connected to the flow passage of the compressor 1 on side of the compressor inlet 3 facing the compressor. The outer sector 3' is not additionally sub-divided. The fresh air feed in this case leads to an outer annular area of the flow passage. The inner sector 3" is split into alternating segments 51, 52, wherein the first segment 51 for recirculated flue gas and the second segment 52 for fresh air for flue gas recirculation are connected to an inner annular area of the flow passage.

The two segments 51, 52 of the inner sector 3" and the outer sector 3' are connected as directly as possible to the flow passage of the compressor 1 on the side of the compressor inlet 3 facing the compressor. The first segment 51 for recirculated flue gases and the second segment 52 for fresh air in this case lead to an annular area of the flow passage in the inner sector 3" of the compressor inlet 3 in an alternating manner. In the depicted side view, a feed for the flue gas flow 21 into a first segment 51 of the compressor inlet 3 can be seen. In addition, a feed for fresh air 2 leads to the compressor inlet via a second segment 52 of the compressor inlet 3, wherein this second segment 52 lies outside the depicted plane.

Figure 6:
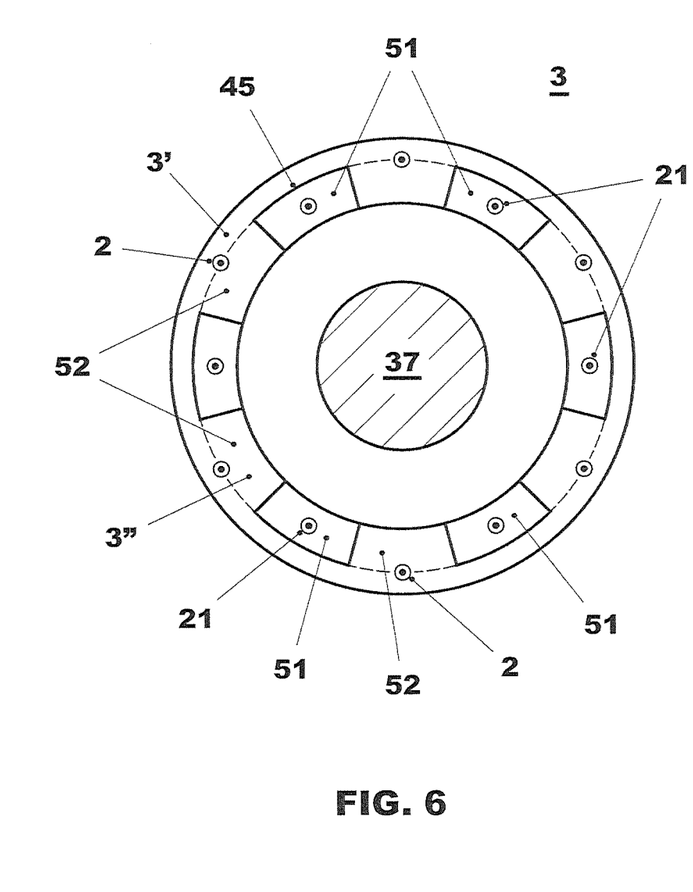
FIG. 6 shows a schematic view of a cross section through a compressor inlet with segments for feed of fresh air and oxygen-reduced gas, which are arranged in an alternating manner in the circumferential direction, and with a stepped introduction in the radial direction.

The corresponding division of the segments 51, 52 and sectors 3', 3" of the compressor inlet 3 in section vi-vi is shown in FIG. 6.

Low-pressure and intermediate-pressure cooling gas 33, 34 is branched from the radial outer wall of the compressor 1 and fed to the hot gas parts of the gas turbine for cooling purposes. In addition, at the end of the compressor high-pressure cooling gas 28 is branched from the radial outer wall of the compressor or of the adjoining diffuser and fed to the hot gas parts of the gas turbine for cooling purposes. In FIGS. 2 and 4, for simplification, only one cooling gas feed to the high-pressure turbine 16 and two to the low-pressure turbine 17 are shown. For simplification, a cooling gas feed to the combustion chambers 14, 15 is not shown, wherein the high-pressure combustion chamber 14 is typically cooled with high-pressure cooling air 28 and the low-pressure combustion chamber 15 is typically cooled with intermediate-pressure cooling air 34. Since the oxygen-rich fresh air is directed into the outer region of the compressor, this is conducted to a large extent around the combustion chambers 14, 15 as cooling gas 33, 34, 28, whereas the oxygen-deprived recirculated flue gases in the core region of the compressor 1 up to the compressor exit are compressed and find their way into the high-pressure combustion chamber 14. As a result of the separation of the gas feed in the compressor inlet 3, a large proportion of oxygen-deprived recirculated flue gases is directed into the high-pressure combustion chamber 14.

In order to realize a homogeneous velocity profile in the inflow to the compressor during different operating states of the gas turbine and with changes of the proportion of recirculated flue gas 21 and of the compressor inlet volume associated therewith, provision can be made in the exemplary embodiments which are depicted in FIGS. 2 to 6 for a control element 42, via which fresh air 2 can be added to the first flue gas partial flow 21 before this is introduced into the compressor 1 via the first segments 51.

FIG. 5 shows a schematic view of a cross section through a compressor inlet 3 with segments 51, 52 for the feed of fresh air 2 and oxygen-reduced gas 21 which are arranged in an alternating manner in the circumferential direction. The first segments 51 are provided in each case for the feed of oxygen-reduced gas 21 and the second segments 52 are provided in each case for the feed of fresh air 2. The segments 51, 52 are arranged in an annular manner around the shaft 37 of the gas turbine and are separated from each other by means of inlet baffle plates 45.

FIG. 6 shows a schematic view of a cross section through a compressor inlet 3 which is stepped in the radial direction. The inner sector 3" and outer sector 3' are separated in each case along first segments 51 by means of an inlet baffle plate 45. Through the outer sector 3', fresh air is fed over the entire circumference. Through the inner sector 3", fresh air and oxygen-reduced gas are fed in an alternating manner in the circumferential direction. Oxygen-reduced gas is fed in each case via the first segments 51 and fresh air is fed in each case via the second segments 52. The first and second segments 51, 52 are separated in the circumferential direction by means of the inlet baffle plates 45. The inner sector 3" and outer sector 3' are not mechanically separated in the region of the respectively second segment 52. The sector boundary is indicated by a dashed line only for illustration purposes.

Figure 7:
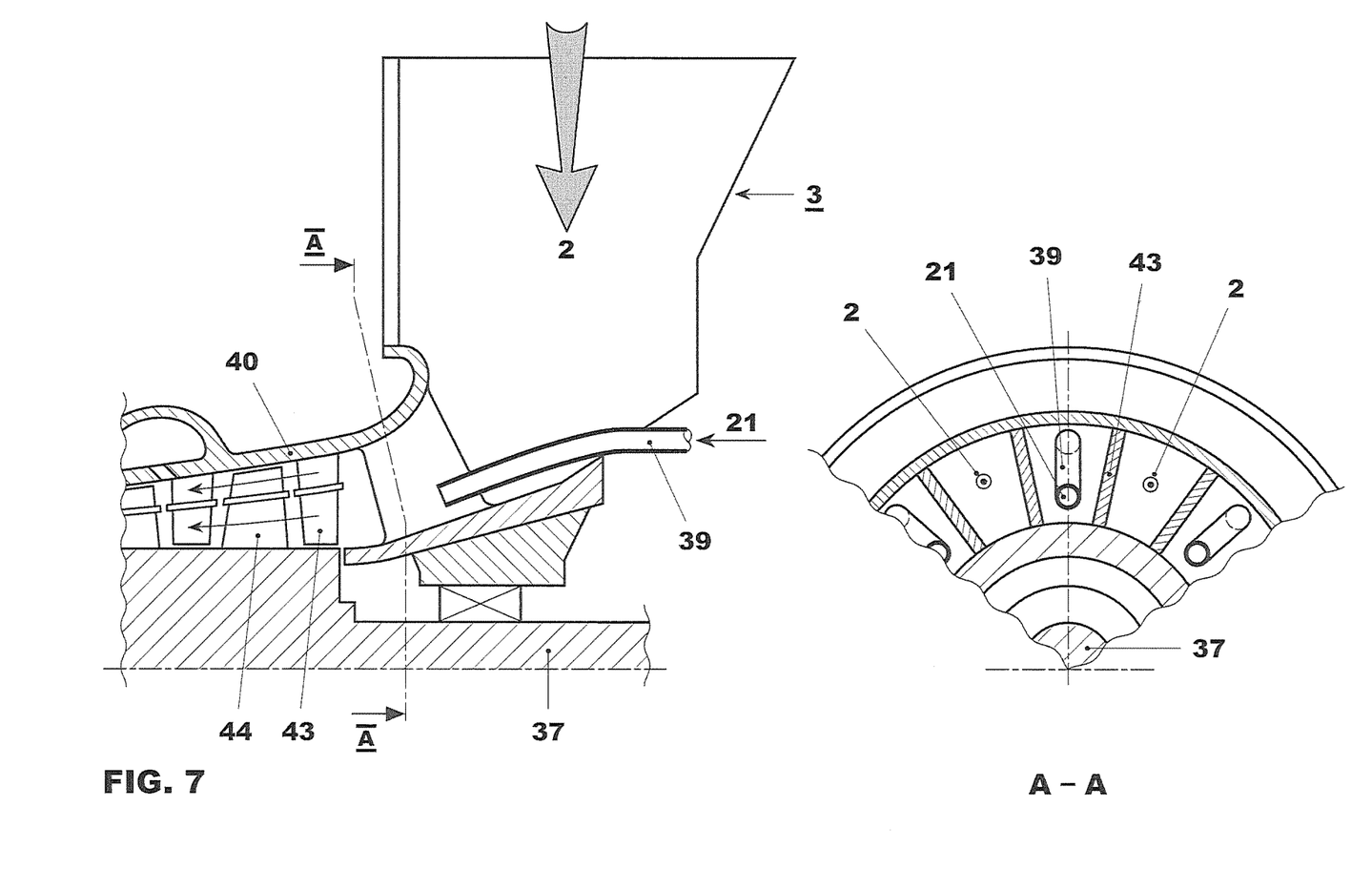
FIG. 7 shows a schematic view of a compressor inlet and of a compressor of a gas turbine power plant with recirculation of flue gases via a multiplicity of feed passages which are arranged in the compressor inlet in an alternating manner around the gas turbine axis.

FIG. 7 shows an alternative feed for oxygen-reduced gas 21. Instead of a separate feed of the recirculated flue gases 21 via a second segment 52 of the compressor inlet 3 which is partitioned off by means of a plate, an unsplit compressor inlet 3 is used. The oxygen-reduced gas 21 is introduced via a multiplicity of feed passages 39 which are arranged axially in a ring-like manner and reach into the compressor inlet 3, wherein the distance between adjacent feed passages 39 is selected to be large enough for a second segment 52 of the compressor inlet 3—in which fresh air is fed—to remain between two adjacent feed passages 39 in each case. Pipes or pipe stubs, for example, the outlet ends of which are oriented parallel to the main flow in the direction of the compressor inlet, are suitable as feed passages 39. In the depicted example, the pipe stubs reach right into the inlet nozzle (bellmouth) of the compressor 1 in order to minimize an intermixing with fresh air 2. The circumferentially alternating feed of oxygen-reduced gas 21 and fresh air 2 can be seen in section A-A.

The pipe stubs can also terminate in the actual compressor inlet 3 or even terminate on the wall of the compressor inlet 3. Preferably, the ends should be arranged in annular manner around the axis of the gas turbine.

The embodiment with a multiplicity of feed passages 39 has the advantage that there is no requirement for an inlet baffle plate 45 for the separation of the compressor inlet 3.

During operation, this has the advantage that the ratio of fresh air to recirculated flue gas can be altered independently of the area ratio of the inlet sectors.

Figure 8:
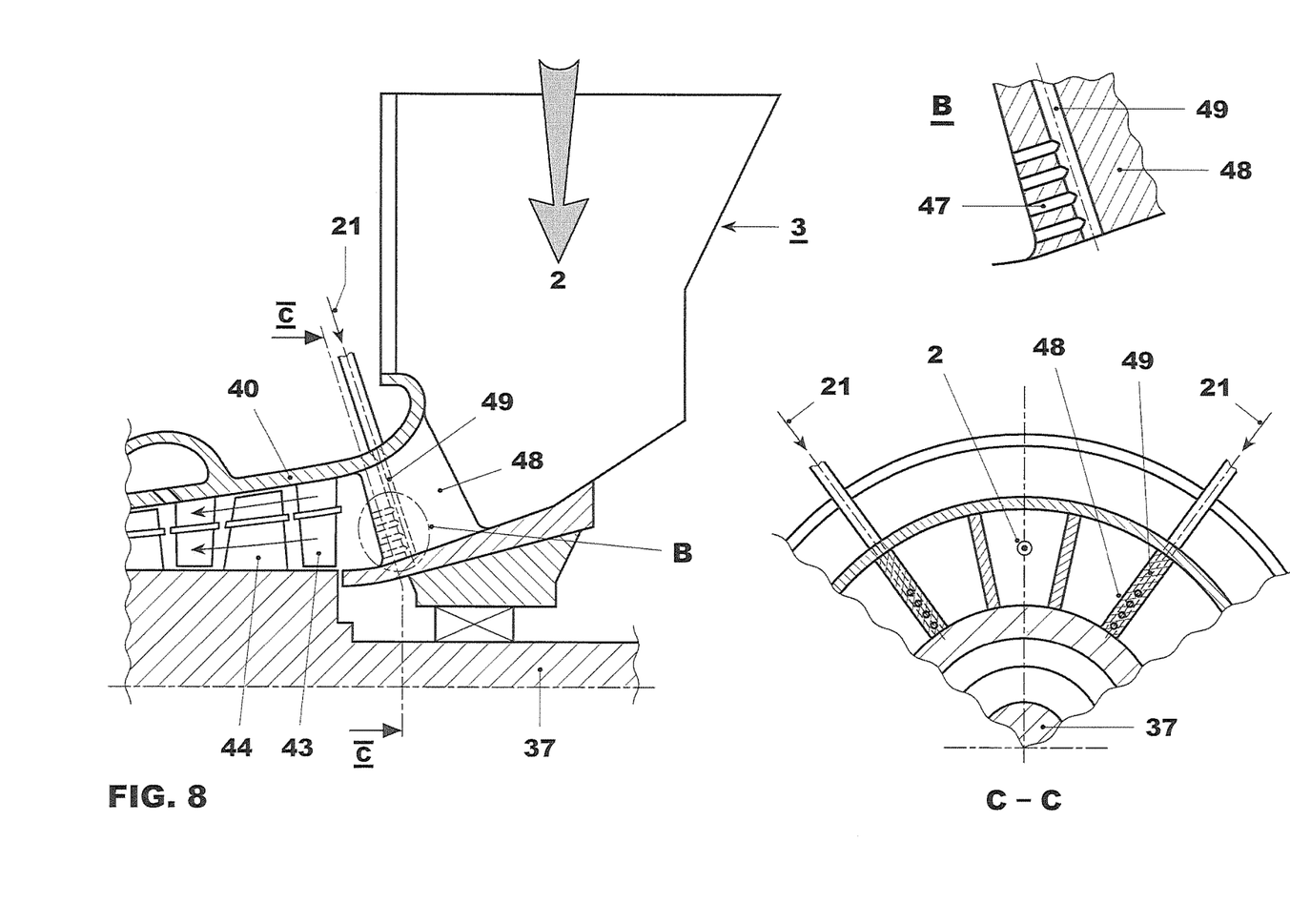
FIG. 8 shows a schematic view of a compressor inlet and of a compressor of a gas turbine power plant with recirculation of flue gases via a multiplicity of feed passages which are arranged in the bearing supports upstream of the compressor.

Instead of a feed of the oxygen-reduced gas 21 through separate feed passages 39, an introduction via the bearing supports 48 of the compressor 1 is also possible, as is shown schematically in FIG. 8. The bearing supports 48, as shown in the detail B, have at least one feed hole 49 from which the oxygen-reduced gas 21 flows through discharge passages 47 parallel to the main flow in the direction of the compressor inlet. The circumferentially alternating feed of oxygen-reduced gas 21 and fresh air 2 can be seen in section C-C.

The spacing of the bearing supports 48, which are used for the introduction of oxygen-reduced gas 21, is to be selected large enough in this case for a second segment of the compressor inlet 3—in which fresh air 2 is fed—to remain between two adjacent feeds in each case.

The invention claimed is:

1. A method for operating a gas turbine having a compressor with an inlet, at least two burners, a combustion chamber and a turbine, the method comprising:

feeding at least one first partial intake flow, consisting of oxygen-reduced gas which has an oxygen concentration which is lower than an average oxygen concentration of a compressor intake flow, and at least one second partial intake flow, consisting of fresh air, to the compressor in an alternating manner in a circumferential direction of the inlet.

2. The method as claimed in claim 1, wherein the alternating manner of feeding oxygen-reduced gas and fresh air is carried out via an inner sector of an inlet cross section relative to a rotational axis of the compressor and fresh air is fed via an outer sector of the inlet cross section relative to the rotational axis of the compressor.

3. The method as claimed in claim 1, wherein the alternating manner of feeding oxygen-reduced gas and fresh air is carried out via an inner sector of an inlet cross section relative to a rotational axis of the compressor and oxygen-reduced gas is fed via an outer sector of the inlet cross section relative to the rotational axis of the compressor.

4. The method as claimed in claim 1, wherein a first partial intake flow, consisting of oxygen-reduced gas, is directed in each case into one burner, or into an integral multiple of adjacent burners, downstream of the compressor.

5. The method as claimed in claim 1, wherein a second partial intake flow, consisting of fresh air, is directed in each case into one burner, or into an integral multiple of adjacent burners, downstream of the compressor.

6. The method as claimed in claim 1, wherein a fuel feed to a burner which is supplied with oxygen-reduced gas compared with a fuel feed to a burner which is supplied with fresh air is reduced so that hot combustion gases at an outlet of the burners have the same oxygen concentration.

7. The method as claimed in claim 1, wherein the inlet of the compressor, to which is connected a flow passage of the compressor, is split into at least one first segment and at least one second segment, outlets of which are arranged in an alternating manner around an annular area of the flow passage in the circumferential direction of the inlet, wherein fresh air is fed in each case via the at least one first segment and oxygen-reduced gas is fed via the at least one second segment in an alternating manner.

8. The method as claimed in claim 1, wherein flue gases of the gas turbine are split into a first flue gas flow for recirculation into an intake flow of the gas turbine and into a second flue gas partial flow for discharging to an environment, and in that the oxygen-reduced gas comprises a recirculated first flue gas flow of the gas turbine.

9. A gas turbine power plant comprising:
a gas turbine with a compressor inlet, at least two burners, a combustion chamber and a turbine, wherein an annular inlet area of the compressor, to which is connected a flow passage of the compressor, comprises at least one first segment and at least one second segment which are arranged in an alternating manner around an annular area of the flow passage in a circumferential direction of the compressor inlet,
wherein a feed for an oxygen-reduced gas, which has an oxygen concentration which is lower than an average oxygen concentration of a compressor intake flow during operation of the gas turbine, is connected to the at least one first segment of the compressor inlet, and a fresh air feed is connected to the at least one second segment of the compressor inlet.

10. The gas turbine power plant as claimed in claim 9, wherein the compressor inlet, to which is connected the flow passage of the compressor, comprises an inner sector relative to a rotational axis of the compressor and an outer sector relative to the rotational axis of the compressor, wherein alternating first segments and second segments are arranged in the inner sector of an inlet cross section relative to the rotational axis of the compressor.

11. The gas turbine power plant as claimed in claim 10, comprising:
a control element by means of which an area ratio of a sum of connecting areas of the at least one first segment to the flow passage of the compressor to sum of connecting areas of the at least one second segment to the flow passage of the compressor can be varied in order to adapt respective area ratios to changes in a ratio between supplied fresh air and oxygen-reduced gas.

12. The gas turbine power plant as claimed in claim 10, wherein the gas turbine power plant comprises an exhaust gas splitter for splitting flue gas flow of the gas turbine into a first flue gas partial flow, for recirculation into an intake flow of the gas turbine, and into a second flue gas partial flow for discharging to an environment, and also comprises a recirculation line which connects the exhaust gas splitter to at least one first segment of the compressor inlet.

13. The gas turbine power plant as claimed in claim 9, wherein the compressor inlet, to which is connected the flow passage of the compressor, comprises an inner sector relative a rotational axis of the compressor and an outer sector relative to the rotational axis of the compressor, wherein alternating first segments and second segments are arranged in the outer sector of an inlet cross section relative to the rotational axis of the compressor.

14. The gas turbine power plant as claimed in claim 9, wherein an integral multiple of burners are arranged per first segment of the compressor, and an integral multiple of burners are arranged per second segment.

15. The gas turbine power plant as claimed in claim 9, wherein a multiplicity of feed passages from feed holes in bearing supports of the compressor for introduction of oxygen-reduced gas are arranged in the compressor inlet concentrically to an axis of the gas turbine in a circumferentially distributed manner.

* * * * *